United States Patent [19]

Someya

[11] 4,256,371
[45] Mar. 17, 1981

[54] ZOOM LENS WITH EXTENDED VARIABLE FOCAL LENGTH RANGE

[75] Inventor: Atsushi Someya, Machida, Japan

[73] Assignee: Canon Kabushiki Kaisha, Tokyo, Japan

[21] Appl. No.: 49,165

[22] Filed: Jun. 18, 1979

[30] Foreign Application Priority Data

| Jun. 23, 1978 [JP] | Japan | 53-76124 |
| Jun. 23, 1978 [JP] | Japan | 53-76125 |
| Jul. 10, 1978 [JP] | Japan | 53-83756 |

[51] Int. Cl.$^3$ .................................... G02B 15/16
[52] U.S. Cl. ........................... 350/423; 350/429
[58] Field of Search ................. 350/184, 186, 187

[56] References Cited

U.S. PATENT DOCUMENTS

| 3,840,290 | 10/1974 | Betensky | 350/427 |
| 3,972,591 | 8/1976 | Suwa | 350/427 |
| 3,992,083 | 11/1976 | Tanaka | 350/427 |
| 4,015,895 | 4/1977 | Hirose | 350/427 |
| 4,080,047 | 3/1978 | Uesugi | 350/427 |

*Primary Examiner*—Conrad J. Clark
*Attorney, Agent, or Firm*—Toren, McGeady and Stanger

[57] ABSTRACT

In the disclosed zoom lens a front lens group serves for focusing, a variator group and a compensator group for zooming and a fixed lens group for forming an image. In the basic focal length range the front lens group is fixed while the variator group and the front lens group are movable. In order to increase or decrease the focal length beyond the basic focal length range, the front lens group, the variator group and the compensator group are moved simultaneously. From the wide angle limit or from the telephoto limit of the basic focal length range through the extended range at both ends the front lens group and the variator group are moved simultaneously.

9 Claims, 12 Drawing Figures

FIG.4
FIG.5
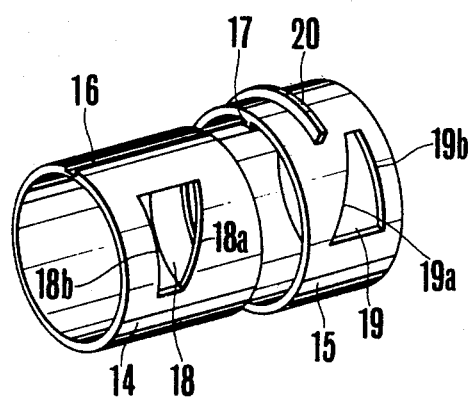
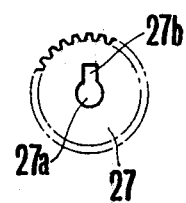
FIG.7
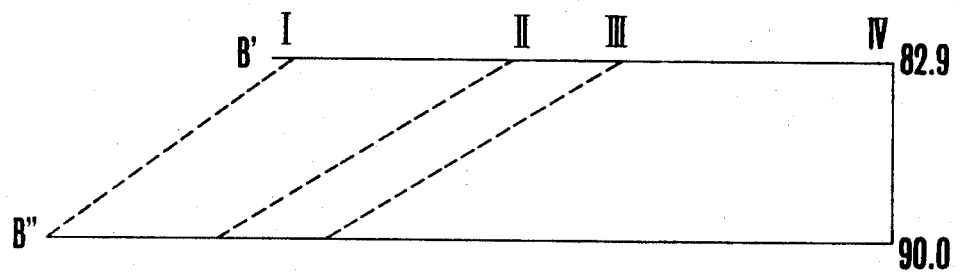

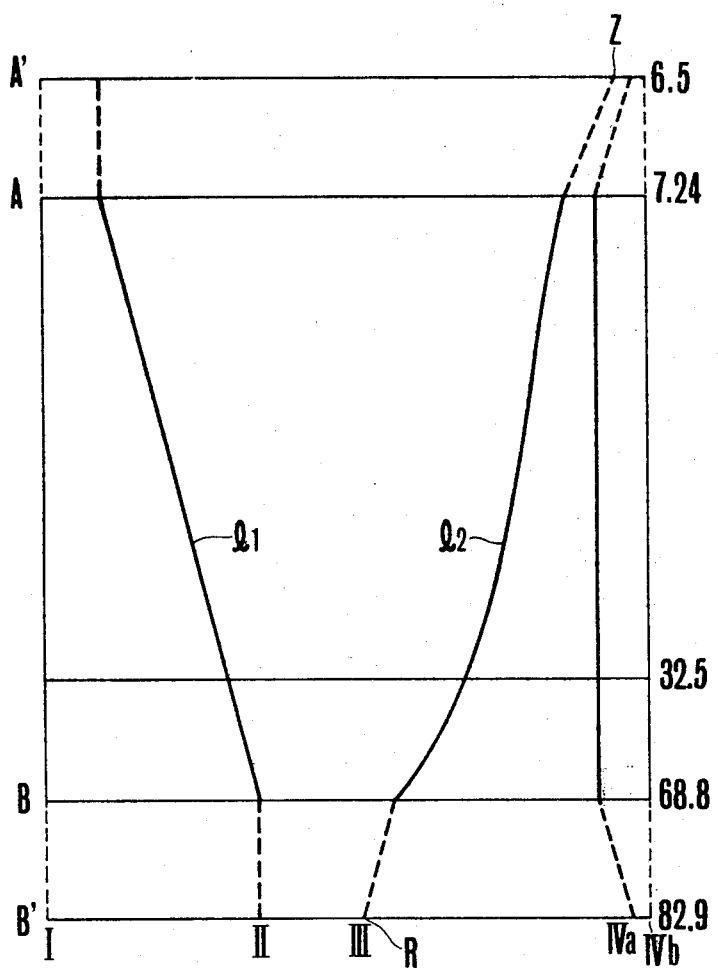

ZOOM LENS WITH EXTENDED VARIABLE FOCAL LENGTH RANGE

BACKGROUND OF THE INVENTION

The present invention relates to a zoom lens, particularly one whose focal length range is extended.

Until now it was known to extend the zooming focal length range of a zoom lens by:

(1) a method in accordance with which the whole or a part of the relay lens group is exchanged, (2) a method in accordance with which a part of the elements in the relay lens group is moved, (3) a method in accordance with which a converter lens group is added inside of, in front of or behind the relay lens group, (4) a method in accordance with which the focusing lens group is exchanged, (5) a method in accordance with which a converter lens is attached in front of the zoom lens. Of the above methods, (1), (3), (4) and (5) are undesirable because of the poor exchange operability and the cost or the portability of the interchangeable lenses. Method (2) is disadvantageous because of the length and the weight of the total system, and because the relay lens group becomes unavoidably long.

Further, methods (1), (2) and (3) in accordance with which the focal length of relay lens is changeable, suffer the inconvenience that in 8 mm or 16 mm cine cameras in which the view finder light beam is branched between an afocal zoom part and a relay lens group, the image cannot be observed through the view finder after the focal length range has been changed.

SUMMARY OF THE INVENTION

A purpose of the present invention is to extend the range of the variable focal length.

Another purpose of the present invention is to increase or decrease the focal length in comparison with the maximum or the minimum focal length obtained when at least two movable lens groups are moved.

Still another purpose of the present invention is to increase or decrease the focal length, whereby in the basic zooming range the front lens group for focusing is fixed, while beyond the range the front lens group is moved at the same time with the movable lens group.

BRIEF DESCRIPTION OF THE DRAWINGS

FIG. 4 shows the combination cam cylinder of the first embodiment in perspective view.

FIG. 5 shows the driving gear of the first embodiment in plane view.

FIG. 7 shows a translation diagram of every lens group of the second embodiment for enlarging the focal length.

FIG. 10 shows the translation curve of the every lens of the third embodiment during the zooming operation.

BRIEF DESCRIPTION OF PREFERRED EMBODIMENTS

Figure 1:
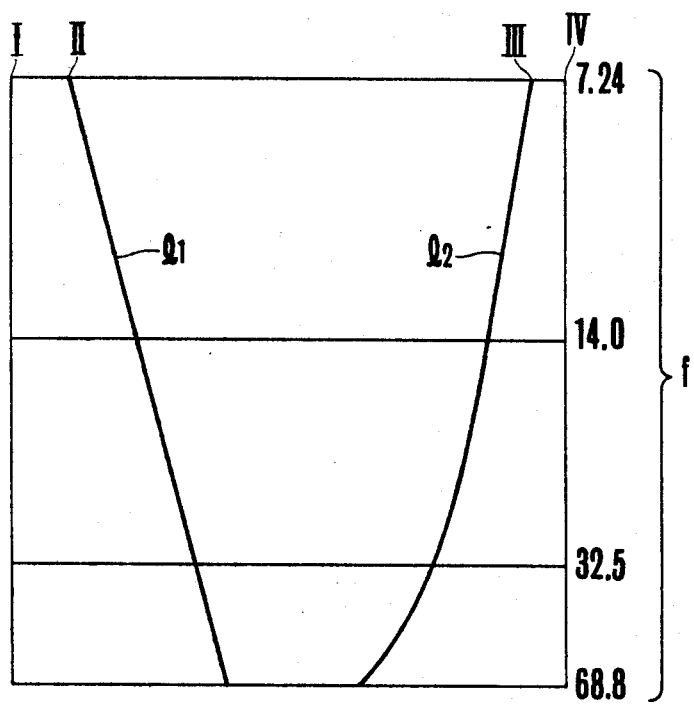
FIG. 1 shows a translation curve of every lens group of the conventional zoom lens during a zooming operation.

FIG. 1 shows the position of each lens group forming a zoom lens relative to the focal length f during a zooming operation. The positions shown are for a focusing lens group I with a positive refractive power, a first movable lens group II with a negative refractive power, a second movable lens group III with a positive refractive power and a relay lens group IV.

The translation curve of the first movable lens group II is linear and the translation curve of the second movable lens group III is non-linear. The first movable lens group II serves mainly for varying the focal length, while that of the second movable lens group III serves mainly for compensating for the deviation of the image plane.

For easy comprehension, the present invention is applied to the zoom lens of example 1 of U.S. Pat. No. 3,972,591. Hereby the data of the zoom lens will be given later.

Further, the numerical figures at the right of the vertical line corresponding to the position of the relay lens indicate the focal length at the extreme wide angle position, and the telephoto position and the two intermediate positions. Hence, simultaneous translation of the first and the second movable lens groups II and III, varies the focal length from 7.238 to 68.79 mm. The aforementioned patent states that the two movable lens groups simultaneously assume the position for the magnification factor $-1$ during the zooming operation, while the lens group for compensating the deviation of the image plane is made to bridge over the two translation curves so as to take part in the variation of the focal length all over the zooming range. This is also effective for the present invention. Namely, the first movable lens group II and the second movable lens group III each have a magnification factor $\beta$II and $\beta$III. During the zooming operation from the wide angle position to the telephoto position $|\beta\text{II}|$ value as well as $|\beta\text{III}|$ is increased to vary the focal length.

Figure 2:
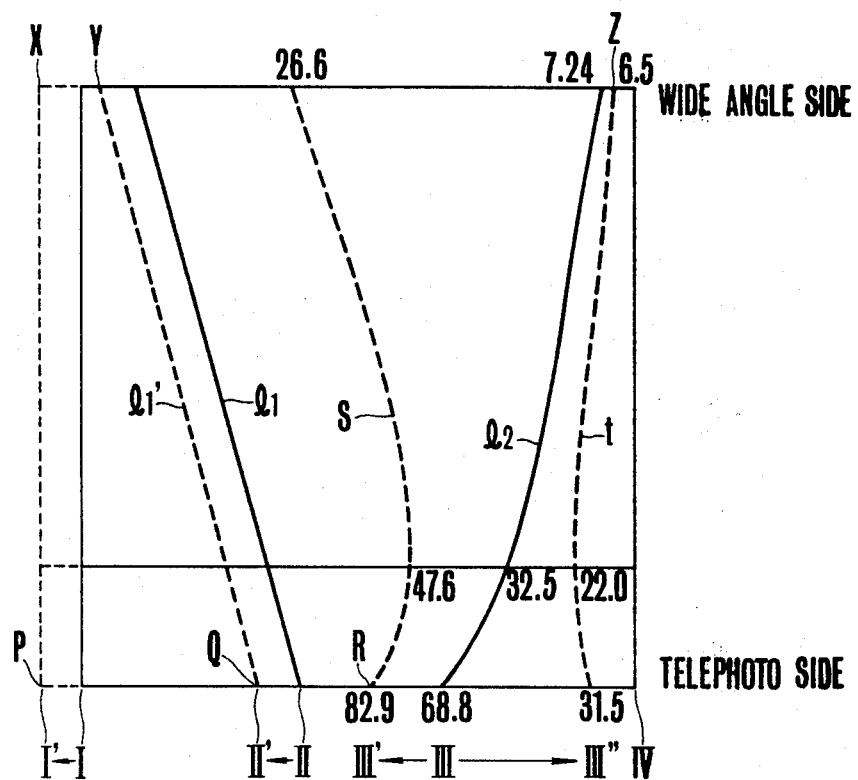
FIG. 2 shows a translation curve of every group of the zoom lens of the present invention during a zooming operation.

The present invention is based upon the principle that when even if $|\beta\text{II}|$ varies in the same range of the magnification factor, $|\beta\text{III}|$ varies in the different range the focal length is shifted in the different range. In FIG. 2 the focusing lens group I and the first movable lens group II are advanced forward while the distance between the groups I and II is kept unchanged. This produces another translation curve for the second movable lens group III and results in a variation of the magnification factor without deviation of the image plane even if the refractive power of every lens, the shape of the translation curve of the first movable lens group II and the position of the relay lens are same. In FIG. 2, I' and II' are the positions of the lens group I and II after translation, while $l_1'$ is the parallely translated curve $l_1$ due to the advancement of the lens group II. Further S and t are other translation curves of the lens group III. These are determined so as to hold the intermediary image of the object translated due to the advancement of the lens groups I and II on the photosensitive plane.

By advancing the focusing lens group I and the first movable lens group II 5.95 mm, and with the translation curve S, the lens groups are shifted in the telephoto direction while the focal length is changed from 26.6 mm to 82.9 mm with the curve t the lens groups are shifted toward wide angle operation while the focal length is shifted from 6.5 mm to 31.5 mm.

In consequence, the focal length can be shifted by advancing the focusing lens group I and the first movable lens group II and translating the second movable lens group III along the curve S or t at the same time.

Moreover, the numerical figures of the focal length for the aforementioned example are for an advancement of 5.95 mm. The condition limiting the advancement is mainly the mechanical interference between the second movable lens group III and the relay lens group at the end of the wide angle side. In consequence, if it is possible to eliminate the limitation, the degree of advancement can be increased further so as to increase the shift amount in the focal length.

It is possible to change the advancement between the wide angle side and the telephoto side by altering the shape of the translation curve.

The data for the aforementioned zoom lens are as follows. Here ri (or Ri) is the radius of curvature of the lens surface, di the thickness of the lens or the air gap, ni the refractive index, $\nu i$ the Abbe number.

Focal length: 7.238–68.79
Zoom ratio: 9.504
Picture angle: 54.2°–5.8°

|    | ri        | di      | ni      | νi    |
|----|-----------|---------|---------|-------|
| 1  | 191.7     | 1.7     | 1.80518 | 25.4  |
| 2  | 58.385    | 0.366   |         |       |
| 3  | 62.232    | 8.5     | 1.64000 | 60.2  |
| 4  | −168.79   | 0.2     |         |       |
| 5  | 43.4021   | 6.5     | 1.64000 | 60.2  |
| 6  | 207.42    | ($d^6$) |         |       |
| 7  | 267.23    | 1.0     | 1.71300 | 54.0  |
| 8  | 18.235    | 5.3     |         |       |
| 9  | −29.654   | 0.7     | 1.69680 | 55.7  |
| 10 | 18.9525   | 4.5     | 1.80518 | 25.5  |
| 11 | 125.36    | ($d^{11}$) |     |       |
| 12 | 5852.3    | 1.19    | 1.80518 | 25.4  |
| 13 | 43.22     | 6.98    | 1.64000 | 60.2  |
| 14 | −37.9     | 0.2     |         |       |
| 15 | 38.2234   | 3.7     | 1.65160 | 58.6  |
| 16 | 224.952   | ($d^{16}$) |     |       |
| 17 | −60.061   | 0.7     | 1.65160 | 58.6  |
| 18 | 21.63     | 2.3     | 1.80518 | 25.4  |
| 19 | 50.002    | 2.35    |         |       |
| 20 | ∞         | 11.0    | 1.63854 | 55.4  |
| 21 | ∞         | 6.06    |         |       |
| 22 | 21.63     | 3.37    | 1.76200 | 40.2  |
| 23 | 63.98     | 2.62    |         |       |
| 24 | 12.0776   | 3.07    | 1.71300 | 54.0  |
| 25 | 29.918    | 1.83    | 1.80518 | 25.4  |
| 26 | 8.5258    | 6.07    |         |       |
| 27 | −13.987   | 1.0     | 1.80518 | 25.4  |
| 28 | 57.565    | 3.96    | 1.67790 | 55.3  |
| 29 | −19.74    | 0.41    |         |       |
| 30 | 117.089   | 2.03    | 1.66446 | 35.8  |
| 31 | −32.11    | 0.1     |         |       |
| 32 | 21.7328   | 2.13    | 1.58144 | 40.7  |
| 33 | −132.36   | 1.2     |         |       |

| Variable distance | | | |
|---|---|---|---|
|  | f = 7.238 | f = 15.72 | f = 68.79 |
| $d^6$ | 1.000 | 14.826 | 28.652 |
| $d^{11}$ | 68.654 | 47.639 | 12.561 |
| $d^{16}$ | 2.006 | 9.195 | 30.446 |

In the above, $R_1$–$R_6$ constitute the radii in the focusing lens group I, $R_7$–$R_{11}$ the first movable group II, $R_{12}$–$R_{16}$ the second movable group III, $R_{17}$–$R_{33}$ the relay lens group IV and $R_{20}$ and $R_{21}$ are the beam splitter for taking out the view finder beam.

Figure 3:
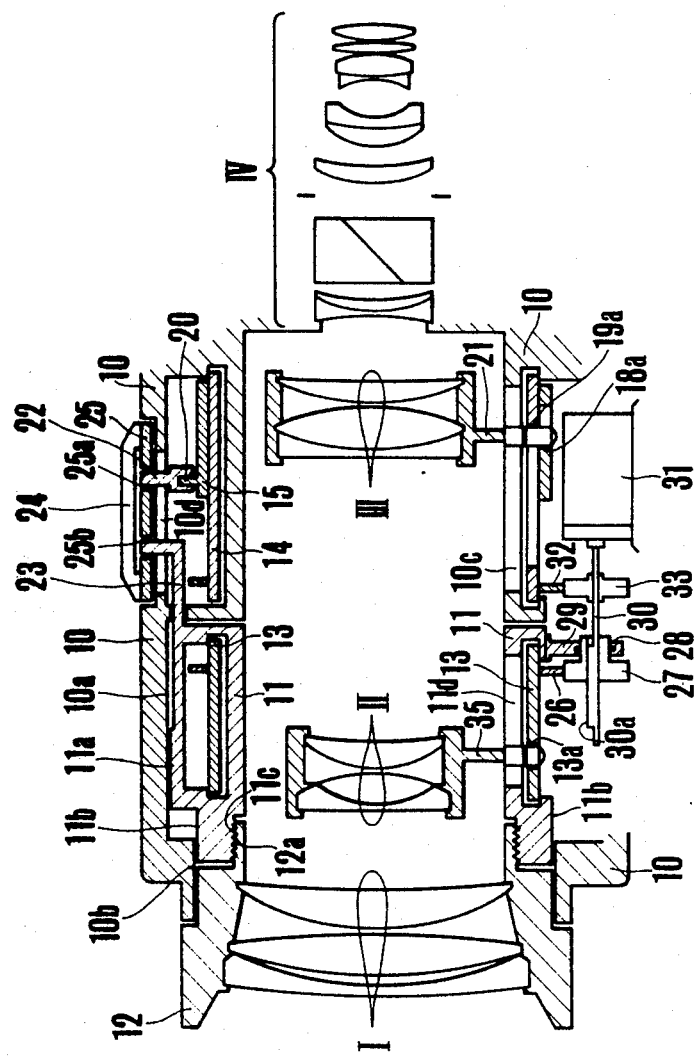
FIG. 3 shows the first embodiment of the present invention in section.

FIG. 3 shows an example of a mechanism embodying the present invention. The mechanism includes the focusing lens group, I the first movable lens group, II the second movable lens group III and the relay lens group IV. A fixed lens barrel 10 is connected to the camera body and a lens barrel 11 is movable along the optical axis. Two parts 11a and 11b on the outside of the movable lens barrel slidably engage in the inside surfaces 10a and 10b of the fixed lens barrel 10. A focusing lens barrel 12 carries the focusing lens group I and a helicoid 12a formed on a part of the lens barrel is engaged with a helicoid 11c formed on the movable lens barrel so that the focusing is possible by rotating the focusing lens barrel 12.

A cam cylinder 13, with a linear cam groove 13a to control the translation of the first movable lens group II, engages the movable lens barrel 11, so as to be rotated around the optical axis.

A first cam pin 35 engages the first movable lens group II and the cam groove 13a as well as a straight cam groove 11d parallel to the optical axis on the movable lens barrel.

Members 14 and 15 form a combination cam cylinder composed of internal cylinder 14 and external cylinder 15. FIG. 4 shows a perspective view of the cylinders 14 and 15. The cylinders 14 and 15 slidably engage each other. The internal cylinder 14 is provided with a groove 16 along the optical axis so as to engage the projection 17 formed inside of the external cylinder so that the external cylinder 15 can be moved along the optical axis with the internal cylinder, while the both cylinders rotate together around the optical axis.

The curved side 18a of a cam opening 18 constitutes a non-linear cam groove corresponding to the translation curve l₂ in FIG. 2 together with the curved side 19a of a cam opening 19, while the curved side 18b forms the translation curve S together with the curved side 19b.

A projection 20 for moving the external cylinder, is provided in a plane perpendicular to the optical axis on the outer surface of the external cylinder 15.

In FIG. 2, a second cam pin 21 is connected to the second movable lens group III and at the same time engages in the cam groove formed with the openings 18 and 19 and the straight cam groove 10c provided in the fixed lens barrel 19 so as to be parallel to the optical axis. The following explains the mechanism by means of which the movable cam cylinder 11 and the external cylinder 15 are moved respectively by a predetermined amount so as to advance the lens groups I and II by a predetermined amount, while the lens group III is moved along the other translation curve.

Member 22 is a driving pin for moving the external cylinder 15. At one end the pin 22 forms a groove in a plane transverse to the optical axis, which groove receives the projection 20 of the external cylinder. Translatory movement of the driving pin 20 along the optical axis moves the external cylinder 15 which can still can be freely rotated around the optical axis. Further, 23 is the advancing pin connected to the movable lens barrel 11. An adjusting ring 24, which serves for shifting the range of the focal length, is connected to a cam cylinder provided with the cam grooves 25a, 25b for controlling the translation amount of the movable cylinder 11 and also connected to the external cylinder 15. The driving pin 22 and the advancing pin 23 engage the straight cam groove 10d arranged on the fixed lens barrel 10 so as to be parallel to the optical axis and cam grooves 25a and 25b, so that along rotation of the adjusting ring 24 a certain amount until it is clicked advances the lens groups I and II a predetermined amount. At the same time the lens group III is moved a certain amount so as to be able to move in the other cam groove.

The cam cylinder 13 and the combination cam cylinder 14, 15 are rotated as follows. A large gear 26 secured on the cam cylinder 13 engages a driving gear 27 that rotates in a bearing 28 mounted on the movable lens barrel 11 by a joint member 29. As shown in the elevational detail of FIG. 5, the driving gear 27 forms a round hole 27a, and a key groove 27b. The hole 27a and the groove 27b receive a rotary drive shaft and an integral projection or key 30a which rotate the gear 27 when the shaft 30 is driven by a driving device 31. During rotation, the driving gear 27 is moved along the optical axis by the movable lens barrel 11. A large gear 32 for driving the cam cylinders 14, 15 engages a pinion 33 secured on the rotary shaft 30.

In operation, the focusing lens barrel 12 is first rotated to control the position of the lens group I and bring the desired object in focus.

Then, the driving device 31 is started so as to rotate the driving gear 27 and the pinion 33 so as to rotate the large gears 26 and 32 which in turn rotate the cam cylinder 13 and the combination cam cylinder 14, 15. As a result, the cam pins 35 and 21 controlled by the cam grooves 13a and 18a are moved in the straight cam groove 11d and 10c so as to transport the lens groups II and III respectively along a predetermined translation curves ($l_1$ and $l_2$) so that the zooming action is enabled.

In order to change the focal length, the adjusting ring 24 is rotated. Hence the driving pin 22 and the advancing pin 23 are pushed out toward the object by means of the straight cam groove 10d an amount determined by the cam grooves 25a and 25b. Then, the external cylinder 15 engaged with the driving pin 22 is moved toward the object, at the same time driving the cam pin 21 of the lens group III toward the object until the cam pin 21 is engaged between the curved sides 18b and 19b. Further, the advancing pin 23 translates the movable lens barrel 11 toward the object a certain amount. At this time the driving gear 27 is moved along the rotary shaft 30.

In consequence, along with the start of the driving device 31 the cam cylinder 13 and the combination cam cylinders 14, 15 are rotated so that the lens group II moves along the one translation curve ($l_1'$), while the lens group III moves along the other translation curve (S) in such a manner that the range of the focal length is shifted.

Although, in the aforementioned embodiment, a number of the whole translation curves are used, it goes without saying that a part of the curves can be used partially. Further, in case the light beam emitting the second movable lens group III is converged while the distance up to the photosensitive plane can be taken long enough, the relay lens group can be eliminated.

It is possible divide the focusing lens group I into a fixed part and a movable part and focus by moving the movable part. The translation curve of the second movable lens group then inevitably becomes a little complicated.

Generally, in case of the above mentioned embodiment the distance between the curves $l_2$ and S or t does not correspond to the amount of advance of the first movable group, so that the mechanism for adjusting both becomes unavoidably complicated. Hence, during the advancing operation photography has to be suspended. This is inconvenient.

Let us suppose that the position of the focusing lens group I, the first movable group II and the second movable group III when the focal length is maximum is P, Q and R with reference to the fixed relay lens group IV, while those when the focal length is minimum is X, Y and Z.

Below, the next embodiment will be explained.

Figure 6:
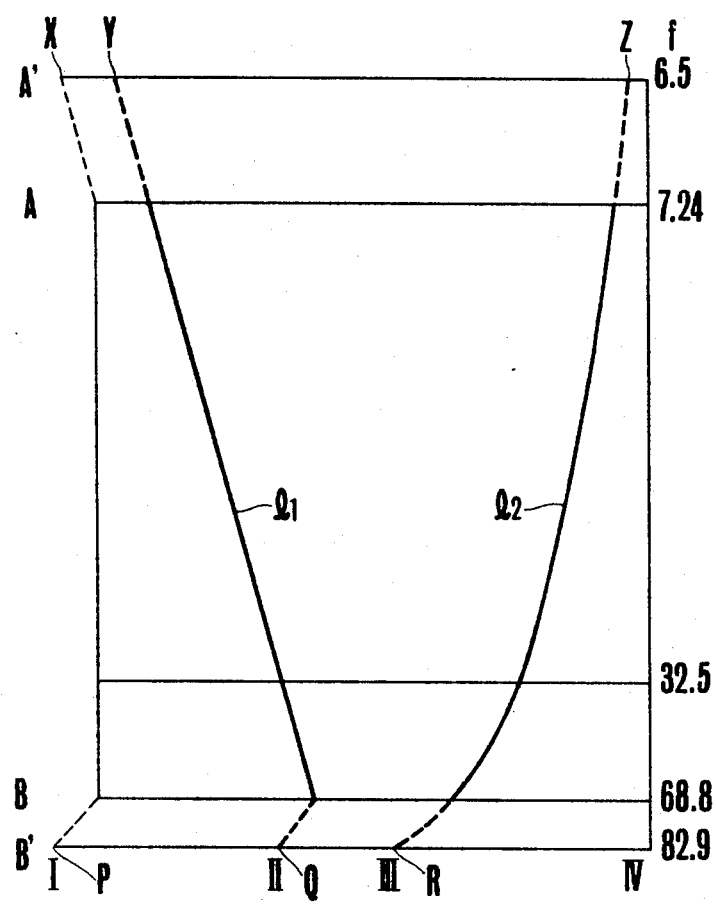
FIG. 6 shows a translation curve of every lens group of the second embodiment during a zooming operation.

The movable groups move along the translation curves in the zooming range between the horizontal lines A and B in FIG. 6 so as to carry out the zooming operation. When the lens groups are moved up to the positions P, Q and R at the end of the telephoto side on the horizontal line B the focal length extends toward the telephoto size, then while the lens groups are moved up to X, Y and Z at the end of the horizontal line A, the focal length extends toward the telephoto side. Hereby, the groups are so arranged that the focal length is continuously altered until the maximum or the minimum is reached instead of a direct translation up to P, Q and R or X, Y and Z. Namely, when the first and the second movable lens groups have reached the horizontal line B the focusing lens group I and the first movable lens group II are gradually advanced toward P and Q while the distances among them are kept unchanged in such a manner that although the magnification factor of the first movable group II remains unchanged, that of the second group III which is moved in order to compensate the deviation of the image plane due to the first movable group is continuously changed so that the synthetic focal length of the whole system is changed continuously up to the horizontal line B' including P, Q and R.

On the other hand, when the first and the second movable groups have reached the horizontal line A, the focusing lens group I and the first movable group II are slowly advanced toward X and Y as a whole while the second movable group II is moved toward Z so that the focal length up to the horizontal line A extends toward the wide angle side. It is possible to enlarge the focal length from 6.5 mm up to 82.9 mm by applying the above-mentioned method to the aforementioned zooming lens, whereby when for example the lens groups are tried to be moved beyond P, Q and R the first movable group II and the second movable group III brings with a mechanical interference in such a manner that the distance cannot be shortened any more.

FIG. 7 shows an application of the above-mentioned method, whereby the distance between the first movable group II and the second movable group III is kept unchanged, the focusing lens group I is advanced and at the same time the first and the second movable group II and III are moved as a whole so as to compensate the deviation of the image plane and enlarge the focal length of the whole system. Thus, the method shown in FIG. 7 is combined with that explained in accordance with FIG. 6 so as to enlarge the focal length of 82.9 mm up to 90 mm.

Figure 8:
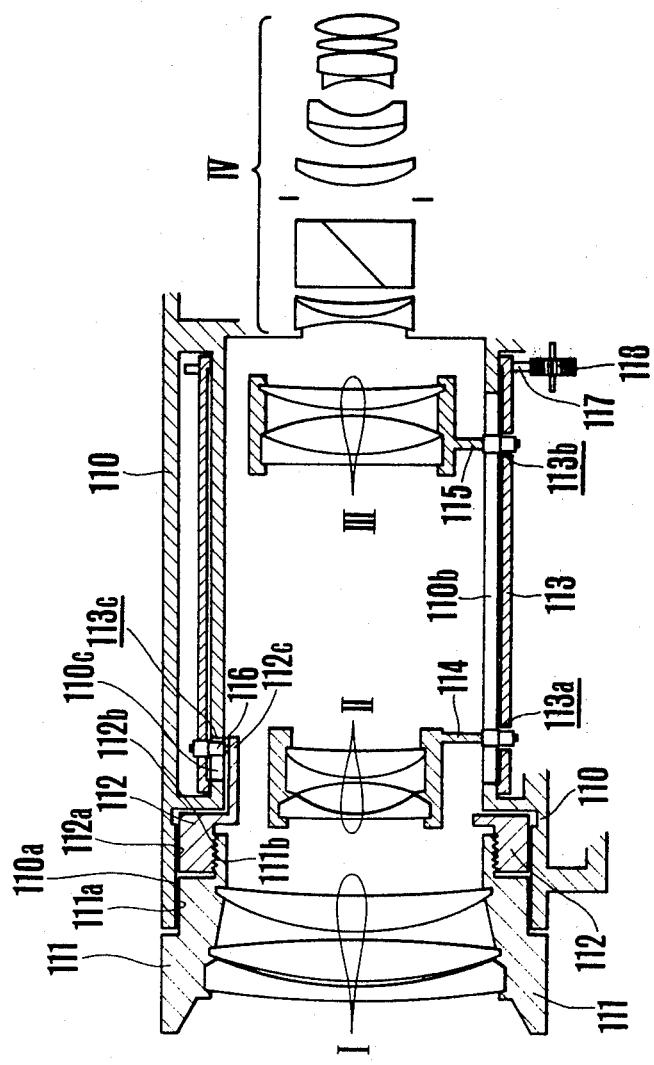
FIG. 8 shows the second embodiment in section.
Figure 9:
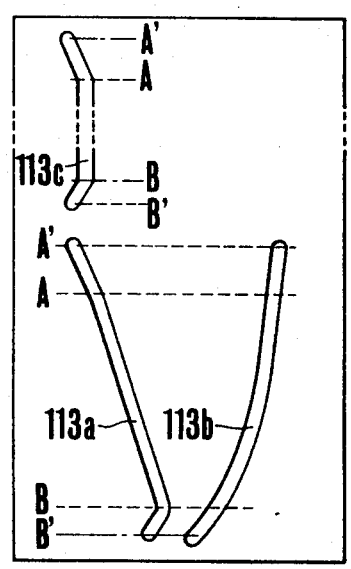
FIG. 9 shows the cam cylinder of the second embodiment in development.

FIGS. 8 and 9 show a mechanism for carrying out the method explained in accordance with FIG. 6. In FIG. 8, I is the focusing lens group, II the first movable group, III the second movable group, IV the relay lens group, 110 the fixed lens barrel, 111 the focus ring and 112 the movable lens barrel, whereby a part 111a of the outside of the focus ring 111 and a part 112a of the outside of the movable cylinder 112 are slidable over the inside at the end of the fixed lens barrel 110.

The focusing lens group I is built in the focus ring 111, while the helicoid 111b is engaged with the helicoid 112b of the movable cylinder 112 so that rotation of the focus ring 111 moves the focusing lens group I along the optical axis during the focusing operation. A cam cylinder 113 is provided with cam grooves 113a, 113b and 113c. FIG. 9 shows the development of these grooves. The cam grooves 113a and 113b in the drawing are shaped so as to be similar to the translation trace of the first and the second movable groups II and III shown in FIG. 6, while the effect of A, A', B and B' are same. That is, the range between the horizontal lines A-B is that of the basic cam groove. These grooves are prolonged to the horizontal lines A' and B'. The last cam groove 113c is provided so as to make the focusing lens group I follow the first movable group II while keeping the set distance from the group II. The range A-B is provided perpendicular to the optical axis so as to make the focusing lens group I stand still during the basic zooming operation, the range A-A' has the same inclination angle as the range A-A' of the cam groove 113a and the range B-B' has the same inclination angle as the range B-B' of the cam groove 113a. In the drawing, the middle part of the groove 113c is eliminated.

A straight cam groove 110b is provided in the fixed lens barrel 110 parallel to the optical axis in order to control the displacement of the movable groups together with the cam grooves 113a and 113b. The cam pin 14 connected to the first movable group II engages the cam groove 113a and the straight cam groove 110b, while the cam pin 115 connected to the second movable group III engages the cam groove 113b and the straight cam groove 110b. Another straight cam groove 110c is provided in the fixed lens barrel so as to be parallel with the optical axis. A cam pin 116 is provided on a part 112c of the movable lens barrel 112 and engages the straight cam groove 110c and the cam groove 113c in the cam cylinder.

A large gear 117 is secured on the cam cylinder 113, while 118 is a zooming driving gear engaged with the large gear 117. The driving gear 118 can optionally be driven backwards by means of a driving device not shown in the drawing.

With the aforementioned construction the focus ring 111 is rotated so as to bring the desired object into focus and then the driving gear 118 is driven. The large gear 117 engaged with the gear 118 is now rotated so as to drive the cam cylinder 113. The cam pin 114 is brought into the cam groove 113a so as to be moved in the straight cam groove 114. At the same time the cam pin 115 is brought into the cam groove 113b so as to be moved in the straight cam groove 114 and the cam pin 115 is brought into the cam groove 113b so as to be moved in the straight cam groove 114. Consequently, the first movable and the second movable groups II and III carry out the alteration of the magnification factor and the movement for compensating the deviation of the picture plane during the zooming operation. When at this time the cam pin is moved in the range A-B of the cam groove, the cam pin 116 is engaged in the range A-B of the cam groove 113c so that the cam pin 116 is not moved. When the cam cylinder is further rotated until the cam pins 114 and 115 are brought into the B—B' range the cam pin 116 is also brought into the B—B' range of the cam groove 113c so as to move the cam pin 116 by the same amount as that of the cam pin 114. The movable lens barrel 112 is now moved relative to the fixed lens barrel 110 while the focus ring 111 engaged with the movable lens barrel 112 is also moved. Also, the effect of the range A—A' is nearly the same.

In consequence, when rotation of the cam cylinder 113 brings the cam pins are brought into the range B—B' or A—A', as explained in accordance with FIG. 6 the focusing lens group I and the first movable group II are moved, while the distance between them is kept unchanged. At the same time the second movable group III is moved along a specified curve so that the magnification factor is continuously changed and the focal length can be further increased or decreased.

In the method shown in FIG. 7, it is sufficient that on the prolongation of the cam groove 113c at the end B' in FIG. 9 a cam groove is formed, while on the prolongation of the cam groove 113a and 113b cam grooves which are parallel to each other and serve to compensate the deviation of the picture plane are formed.

In the aforementioned embodiment, it is possible that the light beam through the second movable group can converge, while the relay lens group can be eliminated when a sufficiently long back focus can be chosen. Further, a position control means making use of an electronic calculator instead of a cam can be used.

On the other hand, the aforementioned image forming group IV may be in the form as an afocal lens IVa converting the light beam through the second movable group III into a parallel light beam and a convergent group IVb for forming an image of the parallel light beam so as to make the system from the focusing lens group I to the afocal lens IVa afocal, as is shown in FIG. 10. In that case the same effect can be obtained if the focusing lens group I and the first movable group II are fixed while the afocal lens IVa is moved.

In consequence, after the zooming operation in the basic range A-B has been finished, the second movable group II is moved toward R in the range B—B' and at the same time the afocal lens IVa is moved toward the image end in such a manner that the focal length could be increased. In the range A—A' the second movable group II is moved toward Z and at the same time the afocal lens IVa is moved toward the image side in such a manner that the focal length could be decreased.

Further, it is possible that instead of an afocal lens a lens having a somewhat refractive power is moved. Then a part of the convergent lens group IVb is operatively engaged with the above movement so as to compensate for the displacement of the image plane. Also, it is effective to arrange a fixed group between the focusing lens group and the first movable group.

Figure 11:
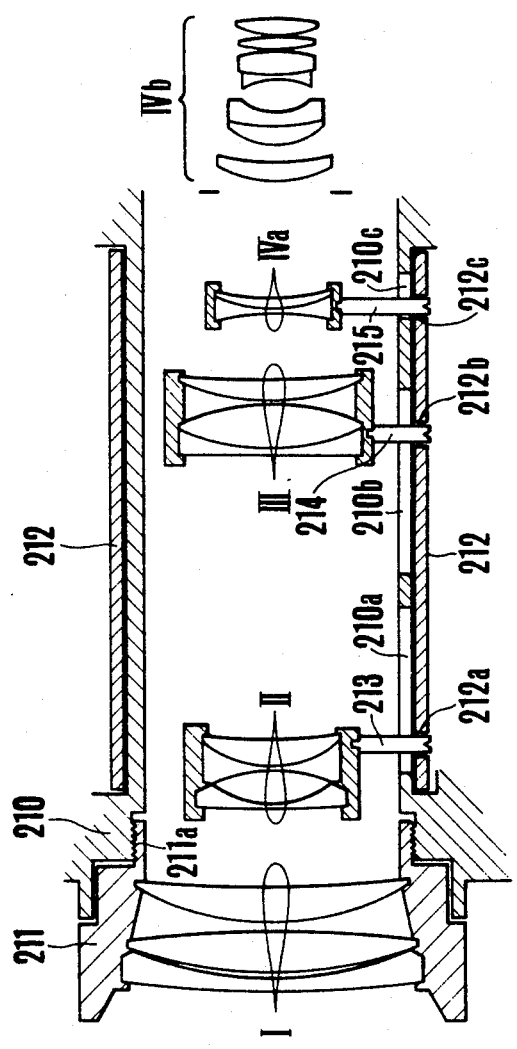
FIG. 11 shows the third embodiment in section.

FIG. 11 shows an example of the mechanism for carrying out the method explained in accordance with FIG. 10. In the drawing, member 210 is a fixed lens barrel, 211 a focusing ring and 212 a cam cylinder. The focusing ring 211 engages the fixed lens barrel 210 by means of the helicoid part 211a. Ring 211 has a built-in focusing lens group I, so that the focusing can be carried out by operating the focusing ring 211.

Figure 12:
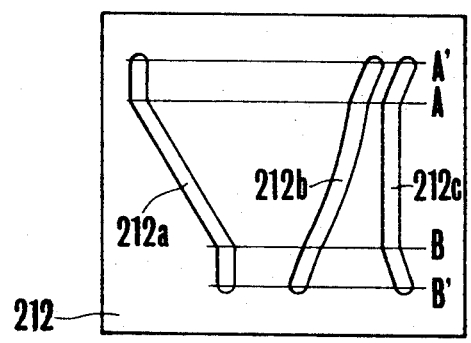
FIG. 12 shows the cam cylinder of the third embodiment in development.

The cam cylinder 212 can be rotated around the optical axis relative to the fixed lens barrel 210 and is provided with three cam grooves 212a, 212b and 212c, whose development is shown in FIG. 12 and which correspond to the displacement curve of the first movable group II, the second movable group III and the afocal lens IVa shown in FIG. 10 in sequence. Further, the cam cylinder 210 is provided with three cam grooves 210a, 210b and 210c parallel to the optical axis. These guide the movable lens groups along the optical axis.

The guide pin 213 is connected to the first movable group II, engaged in the cam grooves 210a and 212a. The guide pin 214 is connected to the second movable group III, engaging the cam grooves 210b and 212b and the guide pin 215 is connected to the afocal lens IVa engaging the cam grooves 210c and 212c.

In consequence, when the cam cylinder 210 is rotated in the range A-B of the cam route, the guide pins 213 and 214 are moved along the optical axis, controlled by means of the cam grooves 210a and 212a, and 210b and 212b, so as to move the movable group and enable the basic zooming. The guide pin 215, which is positioned in the range A-B perpendicular to the optical axis, of the cam groove 212c, never moves along the optical axis.

However, when the guide pin is brought into the range A-A' or B-B' beyond the range A-B, the guide pin 213 is in the groove perpendicular to the optical axis and stands still. The guide pins 214 and 215 move along the optical axis, controlled by means of the cam grooves 210b and 212b, respectively 210c and 212c. This the second movable group III and the afocal lens IVa and permits enlargement of the zooming range.

As explained above, in accordance with the present invention it is possible to enlarge the range of the focal length at the telephoto side and the wide angle side and at the both sides, without altering the conventional zoom lens greatly.

What is claimed is:

1. A zoom lens with an extended variable focal length range comprising:
   a plurality of movable lens groups forming a common optical axis and movable along the optical axis through an ordinary zooming range in which the focal length is varied within an ordinary focal length range and for an extended zooming range beyond the ordinary focal length range; and
   a prime lens group fixed in the ordinary zooming range and moved simultaneously with said movable lens groups when said ordinary zooming operation passes into the extended zooming range.

2. A zoom lens in accordance with claim 1, wherein the prime lens group is movable for focusing.

3. A zoom lens in accordance with claim 1, wherein the prime lens group is movable for focusing, fixed for the ordinary zooming, movable simultaneously with said movable lens groups for the extended zooming and arranged in front of said movable lens groups.

4. A zoom lens in accordance with claim 1, wherein a front lens group for focusing is arranged in front of the movable lens groups, said prime lens group is fixed in the ordinary zooming range, movable along with said movable lens groups in the extended zooming range and arranged between the image plane and the movable lens groups, the front lens group, the movable lens groups and prime lens group constituting an afocal optical system.

5. A zoom lens with an extended variable focal length range comprising:
   a focusing lens movable along the optical axis for focusing on an object;
   a variator movable along the optical axis for causing a variation of the focal length;
   a compensator coupled to the variator and movable simultaneously with said variator along the optical axis along a specific path relative to the variator for compensating for the displacement with the image caused by movement of the variator; and
   a relay lens for forming an image with light through said compensator, said focusing lens and said variator being movable along the optical axis while retaining a constant distance relative to each other, the compensator being movable along a second path relative to the variator for compensating the displacement of the image due to the motion of the variator after the variator has been moved with the focusing lens.

6. A zoom lens with an extended variable focal length range comprising:
   a focusing lens movable along the optical axis for focusing on a desired object;
   a variator movable along the optical axis for causing a variation of the focal length;
   a compensator movable simultaneously with the variator along the optical axis for compensating for displacement of the image caused by movement of the variator;
   a movable lens fixed during ordinary zooming during which the focal length is varied within a specific range and movable simultaneously with the variator and the compensator during extended zooming beyond ordinary zooming; and
   a basic lens for forming an image.

7. A zoom lens system including:
   three lens groups movable along the optical axis;
   focusing means for driving the frontmost lens group along the optical axis for focusing; and
   zooming means for driving two of the lens groups in a first zooming range and the three lens groups in the second zooming range.

8. A zoom lens system in accordance with claim 7, wherein said zooming means includes a plurality of cams for controlling the respective positions of the two lens groups along the optical axis in the first and second ranges and a different cam for controlling the position of other lens groups along the optical axis in the second range.

9. A zoom lens with an extended variable focal length range comprising:
   a plurality of movable lens groups forming a common optical axis and movable along the optical axis through an ordinary zooming range in which the focal length is varied within an ordinary focal length range and for an extended zooming range beyond the ordinary focal length range;
   a prime lens group movable for focusing, fixed in the ordinary zooming range and in the extended zooming range, and arranged in front of the movable lens groups, the relations between two of the lens groups during zooming in the ordinary range being different than the zooming in the extended range.

* * * * *